J. A. AMBLER.

Mechanism for Abrading and Polishing Boot and Shoe Soles.

No. 9,504. Reissued Dec. 21, 1880.

WITNESSES.

L. F. Connor

Arthur Reynolds.

INVENTOR.

James A. Ambler by Crosby & Gregory

Attys.

N. PETERS, PHOTO-LITHOGRAPHER, WASHINGTON, D. C.

UNITED STATES PATENT OFFICE.

JAMES A. AMBLER, OF NATICK, MASSACHUSETTS.

MECHANISM FOR ABRADING AND POLISHING BOOT AND SHOE SOLES.

SPECIFICATION forming part of Reissued Letters Patent No. 9,504, dated December 21, 1880.

Original No. 232,323, dated September 21, 1880. Application for reissue filed November 26, 1880.

*To all whom it may concern:*

Be it known that I, JAMES A. AMBLER, of Natick, county of Middlesex, State of Massachusetts, have invented an Improvement in Mechanism for Abrading and Cleaning or Polishing the Soles of Boots and Shoes, of which the following description, in connection with the accompanying drawings, is a specification.

This invention relates to mechanism for abrading and cleaning or polishing the soles or bottoms of boots and shoes.

In this my invention the boot or shoe the bottom of which is to be finished is supported by a movable carrier or jack, and the moving sole is acted upon from edge to edge transversely by an endless traveling belt having an abrasive surface, and then by an endless brush-belt or a felt-faced belt.

My invention consists, essentially, in an organized machine to automatically finish the bottoms of soles of boots and shoes, it containing, as its chief operative elements, a carrier for the shoe or boot the bottom of which is to be finished or acted upon, an endless rotating belt or belts held in contact with the said sole transversely from edge to edge, so as to act upon the same from its toe along the fore part and into the shank, and means to operate the boot and shoe carrier and belt or belts.

Figure 1:
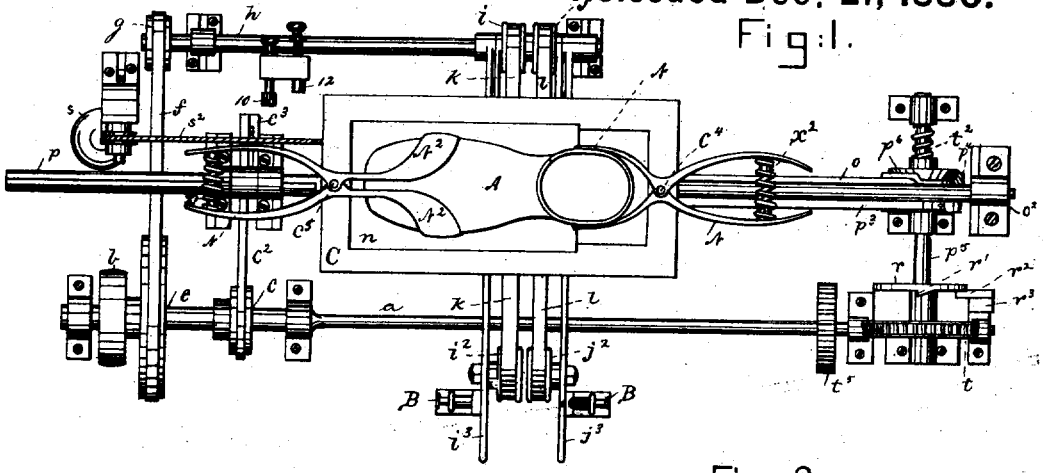
Figure 2:
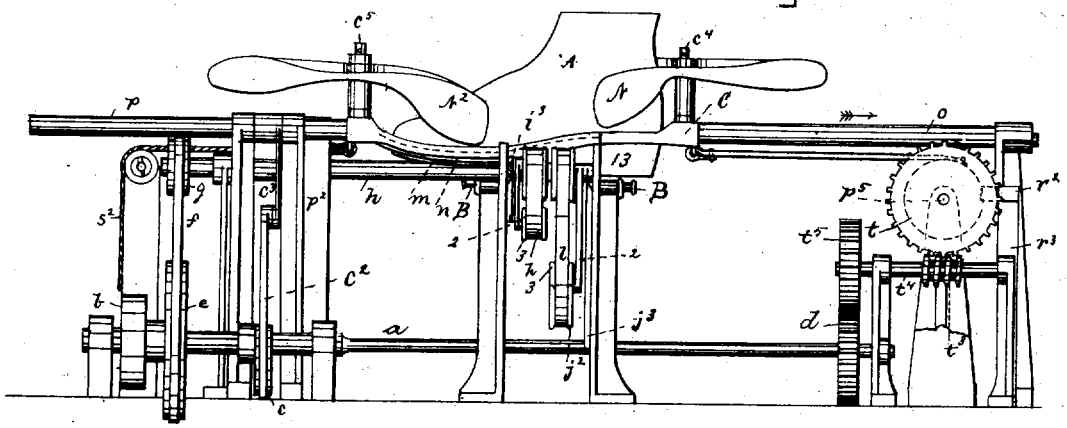
Figure 4:
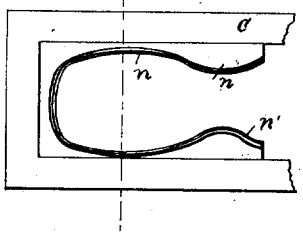
Figure 5:
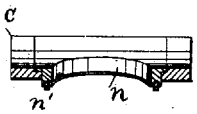
Figure 3:
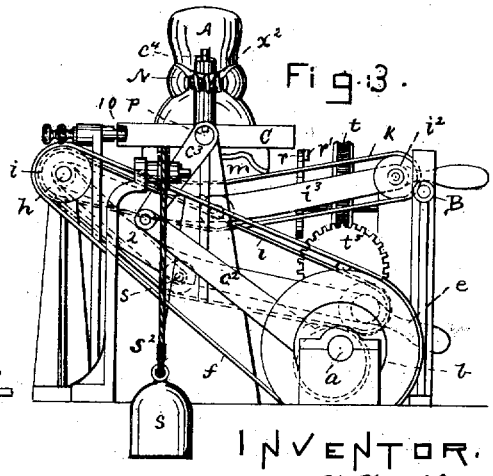

Figure 1 represents, in top view, a machine for abrading and cleaning or polishing the bottoms of soles, the carrier for the shoe being partially drawn backward; Fig. 2, a side elevation thereof; Fig. 3, a left-hand end view of Fig. 1; Fig. 4, an under-side view of part of the shoe-carrier; Fig. 5, a section thereof, and Fig. 6, a detail of the brush-belt, showing its bristles attached.

The main shaft $a$, having a pulley, $b$, to receive a driven band, has upon it an eccentric, $c$, pinion $d$, and belt-pulley $e$. The pulley $e$ receives a band, $f$, extended over belt-pulley $g$ on shaft $h$, the said shaft having on it, as herein shown, two pulleys, $i$ $j$, which receive and rotate endless belts $k$ $l$. The belt $k$ has an abrasive face of glass, emery, or equivalent material, to cut away the bottom of the sole from edge to edge, and the belt $l$, to operate upon the abraded sole, is composed of felt, or, preferably, it is an endless brush-belt, as shown in enlarged detail, Fig. 6. These belts to act upon the sole, one to abrade and the other to finish, smooth, or brush its bottom part, are extended over pulleys $i^2$ $j^2$, mounted on levers $i^3$ $j^3$. These levers may be elevated to place the belts controlled by them against the sole, and when in the full-line position, Fig. 3, they may be locked by the locking devices B.

If it is not desired to have both belts $k$ $l$ to operate simultaneously, one of them may be lowered, as designated by belt $l$ at the right of Fig. 2, and as in Fig. 3. The belts $k$ $l$ are kept taut by means of rollers 3 at the ends of arms 2, the said arms and belts constituting belt-tighteners.

The sole $m$ of the shoe A is placed in the sole-receiving portion $n$ of the movable carrier or jack C, having at its ends rods or shafts $o$ $p$, entered into bearings $o^2$ $p^2$, in which they slide as the carrier is moved longitudinally in the direction of the arrow, Fig. 2, with the shoe by the strap $p^3$, connected with pulley $p^4$, loose on shaft $p^5$, the pulley $p^4$ forming part of a clutch-pulley, the other member, $p^6$, of which is attached to the shaft $p^5$. This shaft $p^5$ has a fixed disk, $r$, with a lug, $r'$, that strikes a projection, $r^2$, on the standard $r^3$ as the strap $p^3$ is wound upon pulley $p^4$, thus moving the shaft $p^5$ longitudinally and causing the fixed part $p^6$ of the clutch to release the loose drum or pulley $p^4$ and permit the weight $s$, connected with the rope or cord $s^2$, attached to the carrier at its opposite end, to quickly move the carrier until checked by one of the stops 10 12, the stop 12 being forward when the belt $k$ is approaching near the heel-breast and the stop 12 when the belt $l$ is nearest the heel-breast.

Instead of weight $s$, I may employ a spring, or, if desired, I might move the carrier longitudinally by means of racks and pinions.

The shaft $p^5$ is extended loosely through the worm-toothed pinion $t$, which is so keyed upon the shaft as to rotate it, but yet so as to permit the shaft to be moved longitudinally when it is desired to free the pulley $p^4$. A spring, $t^2$, on the shaft $p^5$ bears against the hub of the fixed part $p^6$ of the clutch-pulley and moves the shaft longitudinally in opposition to the lug $r'$. The pinion $t$ is moved by the worm $t^3$ on shaft $t^4$, having a pinion, $t^5$, engaged and driven by the pinion $d$.

The eccentric $c$ is, by link $c^2$, connected with the arm $c^3$, the hub of which is so splined to the shaft or rod $p$ as to rock the said rod and carrier C on its center as it is being moved longitudinally.

The sole-receiving portion $n$ is provided at its edges with a shoulder (see Fig. 5) to support it properly in the carrier C. This sole-receiving portion will be changed from time to time, according to the shape and size of the sole of the boot or shoe being operated upon.

To prevent the abrading-surface of the belt from wearing away the corners of the metal receiver $n$, I have grooved the receiver and placed in the groove a strip or line of wood or other material, as at $n'$. The face of the sole $m$ to be operated upon by the belt or belts is permitted to extend a little below the bottom of the receiver $n$, the said receiver falling a little below the under face of the carrier C.

On the carrier C are two standards, $c^4$ $c^5$, which serve as pivots or supports for the two upper-holders N $N^2$, that embrace the heel and toe parts of the boot or shoe upper yet held on the last, each of said upper-holders, as herein shown, being made as clamps shaped to grasp the shoe upon the last, the holders being held together upon the boot or shoe by means of springs $x^2$ $x^3$. After the sole has been abraded and brought into shape by the belt $k$ the said belt will be thrown down from contact with the sole, and the cleaning and polishing belt $l$ be raised to operate upon the sole.

In practice I contemplate adding to the machine a belt or belts to operate upon the face of the heel-lift.

The heel of the shoe is represented by 13.

Figure 6:
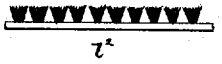

The endless belt (designated by $l$ in Figs. 1 and 2) may be either a felt belt or a brush-belt, such as shown at $l^2$, Fig. 6.

I do not broadly claim the employment of a belt of abrasive material in all classes of machines, for I am aware that such belts are shown in other classes of machinery, especially in machinery for working on wood; but I am not aware that an endless abrasive belt has ever been employed in leather-working machinery; nor am I aware, prior to this my invention, that any organized machine was ever devised to automatically abrade the bottom of a shoe-sole held on a jack or carrier and presented automatically to the action of the abrading-surface. In such an organization I am not aware that a brush-belt has ever been employed, nor am I aware that it has been common in any other class of machinery to employ a brush-belt to follow in operation an abrasive belt.

I claim—

1. In an organized machine for abrading the bottoms of the soles of boots and shoes, an endless moving abrasive belt, and a carrier adapted to hold and present the bottom of the sole of the boot or shoe to be acted upon transversely from edge to edge by the said belt both along the fore part of the sole and into the shank, substantially as described.

2. In an organized machine for finishing the bottoms of the soles of boots and shoes, the endless abrasive and brush belts, and a carrier to hold the boot or shoe and present the bottom of its sole in position to be acted upon in succession by the said belts to abrade and to polish the bottom of the sole, substantially as described.

3. In an organized machine to abrade and clean or polish the bottoms of boot and shoe soles, the movable carrier and its sole-receiver to embrace the edges of the sole, combined with an abrading or polishing belt adapted to work against the said sole transversely and abrade or polish it, according to the kind of belt employed, substantially as described.

4. The endless traveling belt, combined with the longitudinally-movable carrier and sole-receiver thereon, provided with the strip $n$, to obviate the belt striking the receiver, as set forth.

5. In a machine for abrading and cleaning or polishing the bottoms of soles of boots and shoes, the endless traveling belt, combined with the movable carrier, its connected sole-receiver shaped to fit or embrace the fore part of the sole, and means, substantially such as described, to both move the said carrier longitudinally and rock it, for the purposes set forth.

6. The shoe carrier and receiver, combined with the upper-holding devices to engage and hold the upper of the shoe, substantially as described.

7. The carrier to hold the shoe, and an endless traveling belt to co-operate therewith upon the sole, pulleys to drive the belt, and arms to move the pulleys and belt and place the latter in contact with the sole, combined with a belt-tightener, for the purposes set forth.

JAMES A. AMBLER.

Witnesses:
G. W. GREGORY,
D. P. COWL.